United States Patent [19]
Burnham

[11] 3,745,580
[45] July 10, 1973

[54] DIGITAL BEAM DISPLACEMENT CIRCUIT
[75] Inventor: Fred E. Burnham, Silver Spring, Md.
[73] Assignee: Litton Systems, Inc., College Park, Md.
[22] Filed: Apr. 26, 1971
[21] Appl. No.: 137,133

[52] U.S. Cl.............. 343/100 SA, 333/7 D, 343/854
[51] Int. Cl. ............................................. H01q 3/24
[58] Field of Search...................... 343/100 SA, 854, 343/876; 333/7, 7 D

[56] References Cited
UNITED STATES PATENTS

| | | | |
|---|---|---|---|
| 2,688,699 | 9/1954 | Hiehle.............................. | 343/876 X |
| 2,607,008 | 8/1952 | Guarino et al...................... | 333/7 X |
| 3,069,629 | 12/1962 | Wolff................................. | 333/7 X |
| 3,170,158 | 2/1965 | Rotman......................... | 343/100 SA |

*Primary Examiner*—Benjamin A. Borchelt
*Assistant Examiner*—Richard E. Berger
*Attorney*—Alfred B. Levine and Alan C. Rose

[57] ABSTRACT

A matrix switching system controlled by a code of six fixed digital signals to selectively switch signals energizing two spaced feeds of an antenna array. Five different codes are provided to digitally shift the antenna array beam in five discrete steps.

10 Claims, 4 Drawing Figures

PATENTED JUL 10 1973

INVENTOR
FRED E. BURNHAM

BY *Alfred B. Levine*

ATTORNEY

LOGIC

DIODE CONDITION / OUTPUT

| 29 | 28 | 27 | 26 | 25 | 30 | 12 | 13 |
|----|----|----|----|----|----|----|----|
| —  | ON | —  | ON | —  | —  | 1  | 0  |
| ON | —  | —  | ON | ON | —  | .85 | .58 |
| ON | —  | —  | ON | —  | ON | .7 | .7 |
| ON | —  | ON | —  | —  | ON | .58 | .82 |
| —  | ON | —  | —  | —  | ON | 0  | 1  |

INVENTOR
FRED E. BURNHAM

BY *Alfred B. Levine*
ATTORNEY 3,745,580

DIGITAL BEAM DISPLACEMENT CIRCUIT

STATEMENT OF THE INVENTION

This invention relates to digitally controlled beam shifting, and is particularly concerned with switching matrices for selectively energizing antenna arrays to shift its beam in descrete angular steps.

BACKGROUND OF THE INVENTION

In an earlier application of Fred E. Burnham and William H. Clark, of the same assignee, there is disclosed an electronic digital scanning antenna system capable of scanning a beam about a full 360° arc in space in a series of small equal steps. When such system is employed in an instrument landing system for aircraft, the beam must be periodically elevated and lowered at different azimuth positions in its circular scanning path according to the different topographical contours of the land surrounding the airport. Thus, for example, if mountains or hills are located due north of the airport, the radio beam emanating from the airport must be elevated or raised above these mountains to guide the aircraft as the scanning beam traverses the due north azimuth position yet must be again lowered, or tilted downwardly to follow the land topography as the beam continues its azimuth scanning over a flat valley located due west, for example, from the airport.

Briefly, according to the present invention there is provided a digitally controlled switching matrix for rapidly and precisely shifting or tilting the beam from an antenna array between a lower and upper angular position, or to any one or more of plural intermediate positions, all as controlled by a code of six digital signals applied to the matrix.

DESCRIPTION OF A PREFERRED EMBODIMENT

Figure 1:
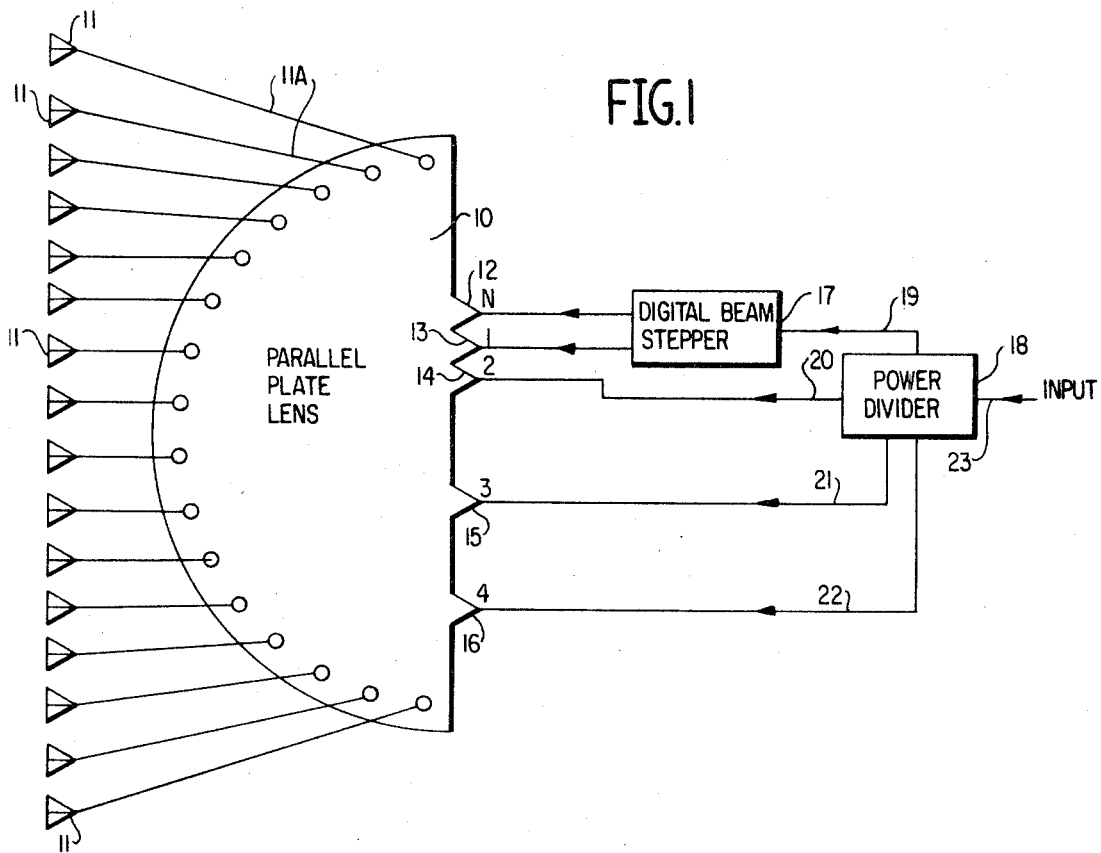
FIG. 1 is an electrical schematic drawing illustrating a preferred antenna array system and a digitally controlled beam stepper.

FIG. 1 illustrates an antenna array 10 that may be employed in combination with a digital beam stepper 17 of the present invention to provide a beam that can be angularly displaced or stepped in a series of descrete angular increments.

Figure 2:
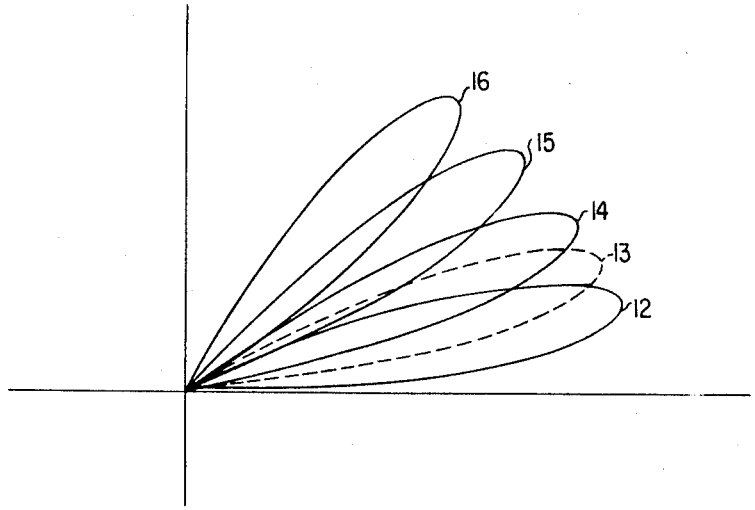
FIG. 2 is an elevation polar plot of the beam components produced by the system of FIG. 1.

As shown, the preferred array comprises a parallel plate lens 10 in the form of a pair of large spaced apart plates having a hemispherical contour or periphery. A series of radiating elements 11, energized by cables or transmission lines, are connected at equally spaced apart locations about the hemispherical contour. To enable the array to produce a plane wavefront beam with equal phasing from all of the radiating elements 11, the feed cable lengths are progressively lengthened, for those cable feeds above and below the horizontal center, to provide a progressive 44° degree phase shift at the frequency involved. The parallel plate lens 10 is provided with five spaced apart feed probes 12, 13, 14, 15, and 16, along its diameter as shown, that are spaced apart in a preselected manner to provide the angularly spaced apart beams shown in FIG. 2. As shown, where only probe 12 is energized, the lowermost beam, similarly numbered as 12 in FIG. 2 is provided. In a similar manner each of the other beams 13, 14, 15, and 16 are produced when the similarly numbered probe of the lens is energized. When more than one probe is energized, the beam produced by the array comprises the algebraic sum of the individual beams.

It will be appreciated by those skilled in the art that both the individual amplitudes and phases of the signals applied to the various probes may be varied to change the waveshape and spatial position of the beam.

For applying a given fixed amplitude distribution of signals to the probes, so as to provide a beam of given waveshape, an input signal 23 is initially applied to a fixed power divider 18 having four output lines 19, 20, 21, and 22. In a preferred embodiment, power divider 18 divides the signal to provide the following amplitude distribution of signals on these lines:

| Line | Relative Amplitude |
|------|---------------------|
| 19   | 1.0                 |
| 20   | 0.8                 |
| 21   | 0.8                 |
| 22   | 1.3                 |

Figures 3, 4:
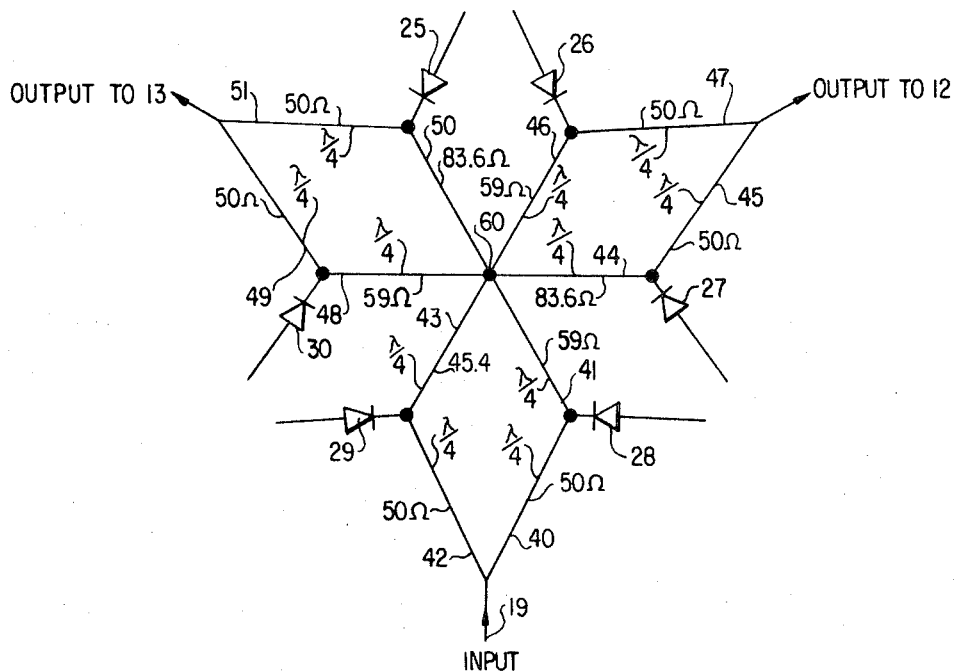
FIG. 3 is an electrical schematic drawing of a preferred digital stepper matrix according to the invention.
FIG. 4 is a tabulation of the logic signals applied to control the digital stepper and the output of the stepper.

For rapidly stepping the beam upwardly or downwardly through a series of different angular positions, the signal on line 19 is directed by the adjustable digital stepper 17 to be applied to either probe 12 or to probe 13, or is apportioned in amplitude between both probes, all as shown in the tabulation of FIG. 4.

For example, when the entire signal on line 19 is applied to probe 12 and probe 13 is deenergized, the resulting beam, comprising the algebraic sum of beams 16, 15, 14, and 12 is tilted downwardly to its lowermost spatial position. Similarly when the entire signal on line 19 is applied to probe 13 and probe 12 is deenergized, beams 13, 14, 15, and 16 are sumed and the resulting beam is tilted to its upper most position. For any intermediate division of power between the two probes 12 and 13 the resulting beam is tilted at an angle intermediate these two angular positions.

FIG. 3 illustrates a preferred vertical beam stepper matrix 17, according to the invention, for providing five descrete angular steps of the beam as controlled by a digital code of signals.

As shown, the digitally controlled matrix includes a number of pairs of series connected transmission lines interconnecting the input line 19 with each of the output lines leading to probes 12 and 13. A first pair of such lines 40 and 41 end at cross-over junction 60, and a second pair of lines 44 and 45 begin at junction 60 and terminate at the output to probe 12. In parallel with the first pair of line 40 and 41 is a third series connected pair 42 and 43; and in parallel with the second pair of lines 44 and 45 is a fourth series connected pair 46 and 47. In a similar manner, a fifth pair of lines 48 and 49 interconnect the cross-over junction 60 with the output leading to probe 13, and a sixth pair of lines 50 and 51 parallel the fifth pair. At each junction of the series connected pairs there is provided a biased diode, including diodes 25 to 30, inclusive, that serve to selectively connect that junction to ground when properly energized.

Each of the transmission lines 40 to 51 in the matrix is one quarter wavelength long at the high frequency of the signal, and each has a very high input impedance with the biased diode in one condition, "off," to block passage of the signal but a different, much lower, finite impedance for transmission of the signal therethrough when the diode is energized to its "on" condition.

In operation, by selectively energizing different groups of diodes in a given logic pattern, the input signal is selectively directed to either output 12 or 13 or is apportioned in given ratios between both outputs. This logic is shown in FIG. 4.

For example, referring to FIGS. 3 and 4, when diodes 28 and 26 are energized to "on" condition, the input signal from 19 passes only through lines 40, 41, 46, and 47 to the output leading to probe 12 and no signal is permitted to pass through to the output leading to probe 13. On the other hand where diodes 25, 26, and 29 are "on" and all others are "off," the input signal passes through lines 42 and 43, reaching the cross-over junction 60, and thence splits with a portion traveling over lines 46 and 47 to output 12 and the remaining portion over lines 50 and 51 to output 13. Due to the fixed relationships of the different impedences of these branching lines, an amplitude of 0.82 of the signal is directed to probe 13. This mode of energization steps up the beam by one increment or step from its lowest position when only probe 12 is energized and probe 13 is deenergized. In a similar manner it can be shown that by applying each other one of the logic codes shown in FIG. 4 to energize the appropriate diodes, the beam can be stepped to any other of the other five angular positions.

It will be noted that any one of the angular steps may be selected without passing through the previous steps, and the described matrix permits a preselection of the desired beam angle at any one of six different angles. Thus when the system is employed in an instrument landing system to scan over an abrupt change of terrain, passing, for example, a precipitous cliff, the beam may be abruptly stepped or tilted from its lowest position with diodes 26 and 28 "on" to its highest position by energizing diodes 28 and 30 to "on."

Although the antenna system and matrix have been described as a signal transmitting array with an input signal applied to the power divider 18, it is believed evident that the described components may be reciprocal devices that pass signals in the reverse direction and accordingly provide a digitally controlled directional scanning receiver. Since other variations may be made without departing from the invention, this invention is to be considered as limited only by the following claims.

What is claimed is:

1. A high frequency switching matrix having an input, a pair of outputs and digitally operating means for selectively apportioning a signal at the input to either output and apportioning an input signal between both outputs in different fixed proportions, said matrix including a plurality of pairs of high frequency transmission lines interconnecting said input and both outputs, each line being one quarter wavelength in length, energizable switching means at the junction of each of said pairs of transmission lines for selectively grounding said junctions thereby to selectively apply a very high impedance at the input of that pair of lines when said switch is energized in one condition and a finite preselected impedance when said switching means is energized in another condition; finite preselected impedances of said lines being apportioned according to the desired apportionment of signals between said outputs, and means selectively applying energization to different groups of less than all of said energizable switching means.

2. In the matrix of claim 1, at least two pairs of series connected transmission lines interconnecting the input and each output.

3. In the matrix of claim 2, at least two additional pairs of series connected transmission lines interconnecting the input and each of the outputs with the additional pairs being in parallel with the first mentioned pairs.

4. In the matrix of claim 1, two pairs of series connected transmission lines interconnecting said input and each output with said switching means at the junction of each said pairs, and said two pairs meeting at a common crossover junction.

5. In the matrix of claim 4, at least two additional pairs of series connected transmission lines, with the additional pairs in parallel relation to the first mentioned pairs.

6. In combination with the switching matrix of claim 1, an antenna array having a plurality of energizable probes with two of said probes energizable by the pair of outputs of said matrix, whereby the beam provided by the antenna array is stepped in angular position upon application of digital energization to different groups of said means.

7. In the matrix of claim 1, a cross over junction, a first pair of said transmission lines interconnecting said input and cross over junction, a second pair of said transmission lines in parallel with said first pair, a third pair of transmission lines interconnecting said crossover junction and one of said outputs, a fourth pair of said lines in parallel with said third pair, a fifth pair of said lines interconnecting said cross-over junction and said other output, a sixth pair of said lines in parallel with said fifth pair, energizable back biased diodes at the interconnection of each pair of lines and selectively energizable to ground said junction, the open circuit impedances of said first pair being 50 ohms and 59 ohms, respectively; the open circuit impedances of said second pair being 50 ohms and 45.4 ohms respectively; the open circuit impedances of the third pair being 59 ohms and 50 ohms respectively, the open circuit impedances of said fourth pair being 83.6 ohms and 50 ohms, respectively; the open circuit impedances of said fifth pair being 83.6 ohms and 50 ohms, respectively; and the open circuit impedances of said sixth pair being 59 ohms and 50 ohms respectively.

8. In the matrix of claim 7, means selectively digitally energizing the back biased diodes to ground the junction of the first pair and third pair thereby to selectively interconnect the input and only one output, and means selectively energizing the back biased diodes to ground the junction of the first pair and the sixth pair thereby to selectively interconnect the input and only the other output.

9. An electronic beam forming and electronic beam tilting system comprising:
an antenna array having a plurality of spaced antenna elements and a plurality of assymmetrically disposed feed means with each feed means energizing all antenna elements, each of said feed means providing a beam component from said antenna elements that is angularly displaced ahead of an adjoining beam component produced by a different one of said feed means, which different one is in turn, angularly displaced ahead of a still different one of said feed means, thereby to provide a series of successively displaced beam components, and means for electronically tilting said beam, said tilting means comprising electronic switching means for adjustably apportioning the amplitude of energy between a pair of said feed means producing adjoining beam components.

10. In the system of claim 9, said switching means being digitally controlled in steps to provide a plurality of descrete angular tilt levels.

* * * * *